3,629,342
SYNTHESIS OF FLUORODINITROMETHANE
Kurt Baum, Pasadena, Calif., assignor to Aerojet-General Corporation, El Monte, Calif.
No Drawing. Filed May 28, 1969, Ser. No. 828,752
Int. Cl. C07c 79/02
U.S. Cl. 260—644                    5 Claims

ABSTRACT OF THE DISCLOSURE

This patent describes a novel method of making the compound fluorodinitromethane having the formula:

by the reaction of dinitrofluoroethanol having the formula:

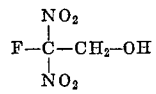

with an oxidizing agent under acidic conditions.

BACKGROUND OF THE INVENTION

Fluorodinitromethane is a valuable compound, having many uses including direct use as an explosive. The compound is also useful as an intermediate for the preparation of ingredients for solid rocket propellants, explosive formulations, drugs and the like. Heretofore this important compound has been synthesized by a procedure requiring the handling of the highly explosive intermediate. The difficulties and dangers associated with the known synthesis techniques have inhibited the development of the chemistry and uses of fluorodinitromethane. The present invention, it is believed, represents a major advance in the art in providing a direct and simple method for the preparation of this compound from fluorodinitroethanol. Fluorodinitroethanol is a well known material which is easily prepared, for example, by the direct fluorination of dinitroethanol salts. In accordance with this invention, the easily prepared starting material is simply oxidized directly to the desired fluorodinitromethane with the evolution of carbon dioxide. It may be anticipated that the synthesis technique of the present invention will be quickly adopted in the industry.

SUMMARY OF THE INVENTION

Briefly, the present invention comprises a novel method of preparing fluorodinitromethane having the formula:

by the oxidation of fluorodinitromethanol having the formula:

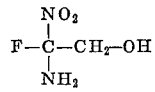

under acidic conditions.

It is an object of the present invention to provide a novel method for the synthesis of fluorodinitromethane.
More specifically, it is an object of the present invention to provide a method for the synthesis of fluorodinitromethane which does not require the handling of highly explosive intermediate compounds.

Still another object of the present invention is the development and provision of a method of preparing fluorodinitromethane which yields the compound in high yield and good purity.

These and other objects and advantages of this invention will be apparent from the more detailed description which follows:

The preferred oxidizing agent for use in the practice of the present invention is sodium dichromate. However, any other of the known inorganic oxidizing agents such as potassium permanganate, ozone, lead dioxide and the like, can be utilized. Thus, the invention is generic to oxidizing agents. As has been indicated, the reaction is normally carried out under acidic conditions. The adjustment of the pH to below about 7 and generally on the order of 2 to 5 may be readily accomplished by use of any mineral acid such as sulfuric acid, hydrochloric acid and the like. The oxidizing agent is typically used in about a stoichiometric amount sufficient to react with the fluorodinitroethanol.

As have been indicated above, the fluorodinitroethanol starting material is readily prepared by the direct fluorination of dinitroethanol or by the direct fluorination of alkali metal salts of fluorodinitroethanol.

DESCRIPTION OF PREFERRED EMBODIMENTS

The following examples are presented solely to illustrate the invention and should not be regarded as limiting in any way. In the example, the parts and percentages are by weight unless otherwise indicated.

EXAMPLE I

A mixture of 14 ml. of sulfuric acid, 8.5 ml. of water and 10.0 g. of dinitrofluoroethanol was added dropwise with stirring, over ½ hour to a solution of 20 g. of sodium dichromate in 40 ml. of water. After 2 hours, an equal volume of water was added and the solution was extracted with 4–50 ml. portions of methylene chloride and 4–50 ml. portions of ether. The extracts were dried over sodium sulfate filtered and the solvents were distilled off using a 5″ metal helices column. Vacuum distillation of the residue from the methylene chloride exaraction yielded 5.2 g. of dinitrofluoroethanol, B.P. 50°/0.4 mm. with an infrared spectrum identical to that of the starting material. The Dry-Ice distillation trap contained 2 ml. of liquid, which was redistilled to give methylene chloride and 0.5 g. of colorless liquid, B.P. 40°/20 mm.

Analysis.—Calc'd for $CHN_2O_4F$ (percent): C, 9.7; H, 0.81; N, 22.6; F, 15.3. Found (percent): C, 11.1; H, 1.24; N, 21.2; F, 15.1.

Distillation of the ether extract yielded 2.2 g. of dinitrofluoroethanol. The total recovery of starting material was 7.4 g. of 74%. The yield of fluorodinitromethane was 24%.

EXAMPLE II

A solution consisting of 50 g. (0.403 mole) of 2-fluoro-2,2-dinitroethanol, 140 ml. of concentrated sulfuric acid and 82 ml. of water was added dropwise with stirring over a 30 minute period, to a solution of 200 g. of sodium dichromate in 400 ml. of water. The reaction temperature was not allowed to rise above 50° C. The mixture was allowed to stand at room temperature for 66 hours. The produce was extracted five times with 200 ml. portions of ether. The ether solutions were combined, washed with 200 ml. of water, and dried over sodium sulfate. The ether was distilled off through a metal-helices-packed distillation column. The residue was contaminated by some water which was azeotroped off by adding 25 ml. of methylene chloride and distilling. Vacuum distillation of the residue gave 15.8 g. of fluorodinitromethane, B.P. 45° C./30 mm.

Hg, $N_D^{25}$ 1.4330. Redistillation of material recovered in the Dry-Ice trap used in the above distillation gave an additional 3.6 g. of fluorodinitromethane, $N_D^{25}$ 1.4030. A total of 21.4 g. of fluorodinitromethane was isolated (65% yield, 43% conversion).

As is evidenced by the foregoing examples, the process of the present invention yields the desired fluorodinitromethane in good yield without the necessity for any elaborate and extended purification techniques. In general, the desired compound is isolated from the reaction mixture by conventional procedures involving distillation, recrystallization and/or extraction.

This preparation of the 1-fluoro-1,1-dinitroethanol starting material is as follows: To about 0.25 mole of potassium 1,1-dinitroethanol was added 180 ml. of water. The stream of fluorine (2–3 liters per hour) diluted with helium (10 liters per hour) was passed at 25–30° C. into the solution of potassium potassium 1,1-dinitroethanol for a period of 4 hours. The mixture was stirred vigorously during the course of the reaction, and cooling had to be applied to control the reaction temperature. Ten liters of fluorine gas were required to complete the reaction. The reaction mixture was extracted with five 71 ml. portions of ethyl ether and the combined extracts were dried over anhydrous sodium sulfate and filtered. The solvent was removed from the solution at room temperature and aspirator pressure to give 25 grams of pale yellow liquid. The crude material was purified by vacuum distillation to yield 17.0 grams of water-clear liquid. The liquid material was redistilled to yield 15 grams of colorless liquid.

The fluorodinitromethane obtained by this invention contains a plurality of nitro groups and is thus inherently useful as an explosive. These compounds can be used in any conventional explosive missile, projectile, rocket, or the like, as the main explosive charge.

Having fully described the invention, it is intended that it be limited only by the lawful scope of the appended claims.

I claim:

1. A novel method for the preparation of fluorodinitromethane having the formula:

which comprises reacting fluorodinitroethanol having the formula:

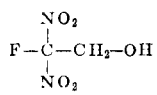

with an oxidizing agent under acidic conditions.

2. A method of preparing fluorodinitromethane having the formula:

which comprises reacting fluorodinitroethanol having the formula:

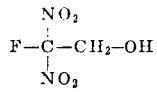

with sodium dichromate in the presence of water acidified with sulfuric acid.

3. The method of claim 2 wherein the fluorodinitroethanol and sodium dichromate are used in about stoichiometric amounts.

4. The method of claim 2 wherein the fluorodinitromethane is recovered by distillation from the reaction mixture.

5. A novel method for the preparation of fluorodinitromethane having the formula:

which comprises reacting fluorodinitroethanol having the formula:

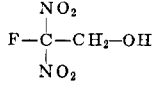

with an oxidizing agent at a pH of from about 2 to 5.

References Cited
UNITED STATES PATENTS

| | | | |
|---|---|---|---|
| 3,274,264 | 9/1966 | Graff et al. | 260—644 |
| 3,388,147 | 6/1968 | Kamlet et al. | 149—88 X |
| 3,435,079 | 3/1969 | Adolph et al. | 260—644 |

LELAND A. SEBASTIAN, Primary Examiner